(12) United States Patent
Halope et al.

(10) Patent No.: US 7,710,276 B2
(45) Date of Patent: May 4, 2010

(54) RADIO FREQUENCY IDENTIFICATION DEVICE SUPPORT AND ITS MANUFACTURING METHOD

(75) Inventors: Christophe Halope, Cannes (FR); Anne Le Paih, Grenoble (FR)

(73) Assignee: Ask S.A., Valbonne-Sophia Antipolis (FR)

( * ) Notice: Subject to any disclaimer, the term of this patent is extended or adjusted under 35 U.S.C. 154(b) by 254 days.

(21) Appl. No.: 11/790,902

(22) Filed: Apr. 27, 2007

(65) Prior Publication Data

US 2007/0279232 A1 Dec. 6, 2007

(30) Foreign Application Priority Data

Apr. 28, 2006 (FR) .................................. 06 03862

(51) Int. Cl.
- *G08B 13/14* (2006.01)
- *H01L 21/00* (2006.01)
- *H01L 21/31* (2006.01)
- *H01L 21/469* (2006.01)

(52) U.S. Cl. .................. 340/572.8; 438/108; 438/761
(58) Field of Classification Search .............. 438/156, 438/107, 108, 761–763; 340/572.1–572.9
See application file for complete search history.

(56) References Cited

U.S. PATENT DOCUMENTS

| | | | |
|---|---|---|---|
| 5,528,222 A | 6/1996 | Moskowitz et al. | 340/572 |
| 5,786,626 A | 7/1998 | Brady et al. | 257/673 |
| 7,341,181 B2 * | 3/2008 | Bonalle et al. | 235/380 |
| 2003/0136503 A1 | 7/2003 | Green et al. | 156/264 |
| 2003/0153120 A1 | 8/2003 | Halope | 438/106 |
| 2003/0168514 A1 | 9/2003 | Rancien et al. | 235/492 |
| 2004/0266165 A1 * | 12/2004 | Utsunomiya | 438/616 |
| 2005/0035590 A1 * | 2/2005 | Jones et al. | 283/74 |
| 2005/0275540 A1 | 12/2005 | Halope et al. | 340/572.8 |
| 2006/0176181 A1 | 8/2006 | Halope | 340/572.8 |
| 2006/0246738 A1 * | 11/2006 | Isobe et al. | 438/769 |
| 2007/0029391 A1 | 2/2007 | Halope | 235/492 |
| 2007/0158315 A1 * | 7/2007 | Tanaka et al. | 219/121.8 |
| 2008/0125531 A1 * | 5/2008 | Sugawara | 524/384 |

* cited by examiner

*Primary Examiner*—Jennifer Mehmood
(74) *Attorney, Agent, or Firm*—James C. Lydon

(57) ABSTRACT

A radio frequency identification device support (2) featuring an antenna (12) screen-printed on a support (20) and a chip (10) connected to the connection terminals (17 and 19) of the antenna. According to a main characteristic of the invention, a thermoplastic layer (22) and a top layer of synthetic paper (24) are laminated on the antenna support (20) so that the antenna and the chip are trapped in the thermoplastic and the three layers (20, 22, and 24) cannot be separated and so that the device is resistant to water and humid environments.

20 Claims, 4 Drawing Sheets

RADIO FREQUENCY IDENTIFICATION DEVICE SUPPORT AND ITS MANUFACTURING METHOD

TECHNICAL FIELD

This invention concerns radio frequency identification devices designed to be built into objects such as security documents and specifically concerns a radio frequency identification device support and its manufacturing method.

BACKGROUND ART

Contactless Radiofrequency Identification Devices (RFIDs) are increasingly used for identification of persons moving about in controlled access zones or transiting from one zone to another. A contactless RFID is a device made up of an antenna and a chip connected to the terminals of the antenna. The chip is usually not powered and receives its energy by an electromagnetic coupling between the antenna of the reader and the antenna of the RFID, information is exchanged between the RFID and the reader and particularly information stored in the chip that relates to the identification of the holder of the object on which the RFID is located and to his/her authorization to enter into a controlled access zone.

In this manner, passports can incorporate RFIDs to identify the passport holder. The chip memory contains information such as the identity of the passport holder, his/her country of origin, his/her nationality, visas of different countries visited, dates of entry, restrictions of movements, biometric elements, etc. The RFID device is generally incorporated into the bottom cover board of the passport. An antenna is then screen-printed using ink loaded with particles of silver on the reinforced bottom cover board of the passport cover. The chip is then connected by gluing to the connection terminals of the antenna. Then, the flyleaf of the quire of passport pages is laminated to the back of the reinforced top cover board.

This embodiment has a drawback, as it is not waterproof and particularly cannot resist the passage of the passport through a washing machine. If the paper on which the antenna is screen-printed is not water resistant, the latter absorbs water and swells up, which causes fractures of the antenna and therefore a rupture of the electrical connection between the antenna and the chip.

This problem can be overcome by the use of an RFID device made up of a plastic "inlay". In this case, the inlay includes the antenna and the chip, the whole assembly being embedded in plastic layers. The inlay is then bonded between the flyleaf and the passport cover. One of the drawbacks of such an RFID device is the difference in material between the inlay and the passport. The latter being made of plastic, the bonding between the two is not optimal.

Using an RFID support with at least one of its external sides made of paper allows this disadvantage to be overcome.

But the problem of using paper depends on its ability to delaminate over its thickness in case of an attempt of pulling it out. The delamination can also occur on the edges of the support after a certain period of use, which is a definite disadvantage when the support is intended to be used in a secure document whose lifespan must extend over several years.

Furthermore, a secure document such as a passport implies that the passport pages and consequently the cover supporting the RFID device will be subjected to impacts due to stamping or affixing visas, which exposes the electronic chip to a significant risk of destruction.

SUMMARY OF THE INVENTION

This is why the purpose of this invention is to counter these drawbacks by offering a radio frequency identification device support that has a good affinity to gluing with paper and that does not delaminate over the thickness and moreover that protects the RFID device from risks of destruction caused by impacts or shocks.

Another object of the invention is to supply an identity booklet such as a passport integrating such a radio frequency identification device without any visible mark from the chip on the outside of the cover.

The purpose of the invention is thus a radio frequency identification device support featuring an antenna screen-printed on a support and a chip connected to the connection terminals of the antenna. According to a main characteristic of the invention, a thermoplastic layer and a top layer of synthetic paper are laminated on the antenna support in order to obtain an RFID device resistant to water and humid environments so that the antenna and the chip are trapped in the thermoplastic and so that the three layers cannot be separated.

Another purpose of the invention relates to an identity booklet, which includes a radio frequency identification device (RFID) support according to the first purpose of the invention.

Finally, another purpose of the invention concerns a manufacturing method of a radio frequency identification device (RFID) support, the device featuring an antenna and a chip connected to the antenna, the method including the following steps:
- screen printing an antenna featuring contacts on a support,
- placing adhesive dielectric material between the contacts of the antenna,
- positioning the chip on the support so that the chip's contacts are located opposite the antenna's contacts,
- connecting the chip to the antenna's contacts by exerting pressure on the chip,
- placing on the support a thermoplastic layer and a top layer of a non-creeping material such as synthetic paper, the top layer being provided with a cavity at the location of the chip,
- laminating together the support, the thermoplastic layer and the top layer in order to obtain an RFID device resistant to water and humid environments and so that the antenna and the chip are trapped in the thermoplastic and so that the three layers cannot be separated.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE INVENTION

Figure 1:
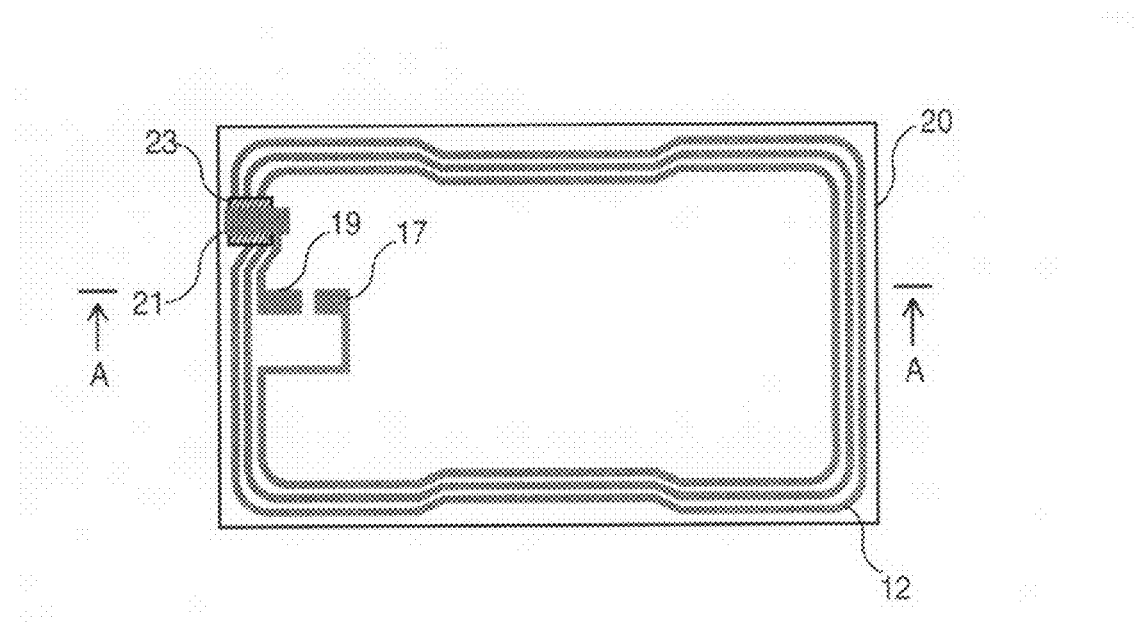
FIG. 1 represents the front view of the antenna support to which the RFID device is bonded.

With reference to FIG. 1, a first layer 20 is used as a support for the antenna and its size corresponds to that of a closed passport, that is to say approximately 88×125 mm. The layer 20 is made of a non-creeping material, that is to say a material that does not deform irreversibly when the temperature increases. The material of layer 20 is preferably a material whose cohesion is not modified much during a hot lamination operation which consists in exerting pressure. Due to high mineral loads, it features a good wettability (capacity of a surface to be wet by a given material) and ability to printing and gluing. The antenna 12 that makes up an essential element of the RFID device consists of one or more turns screen printed with an electrically conductive polymer ink, loaded with conductive elements such as silver, copper or carbon. Each end of the antenna is connected to one of the two contacts 17 and 19 of the antenna which are also screen-printed. The turns are interconnected by an electric bridge 21 most commonly referred to as the "cross-over". An insulating strip 23 of dielectric ink is screen printed between the cross-over and some of the turns of the antenna 12 to allow the turns of the antenna to overlap without electrical contact. According to a preferred embodiment of the manufacturing process, the antenna is screen printed on this material in several steps. The first step consists in screen printing the turns of the antenna 12 and the two contacts 17 and 19 of the antenna. The second step consists in screen printing an insulating strip 23 to allow the turns of the antenna 12 to overlap. The third step consists in screen printing the electric bridge 21 which connects the outermost turn of the antenna 12 of the group of turns.

The next step consists in connecting the chip on the contacts of the antenna 12. An adhesive dielectric material is placed on the antenna support 20, between the two contacts 17 and 19 of the antenna 12. This adhesive material is applied before the chip is placed on the support, unlike the traditional "Flip Chip" process in which the adhesive is applied once the chip is connected. This step is thus much easier to perform and output is much better. The adhesive used is preferably epoxy resin that cross-links at 150° C. It is also possible to use cyanoacrylate type glue, which polymerises at ambient temperature.

Figure 2:
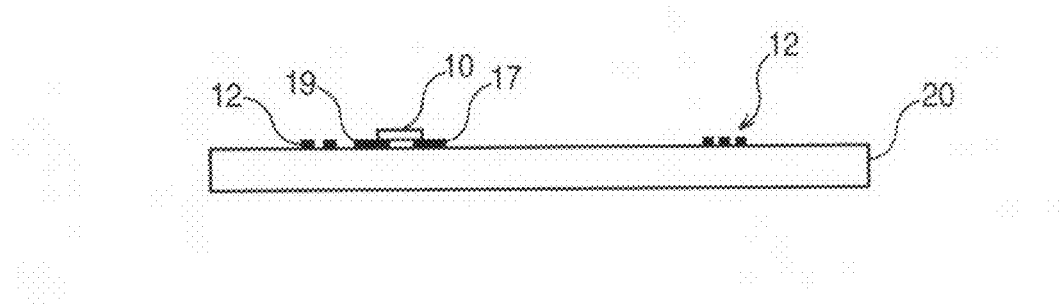
FIG. 2 represents a cross-section of the antenna support to which the RFID device is bonded.

Once the adhesive material has been applied, the chip 10 is positioned on the antenna support so that the chip's contacts 17 and 19 are opposite the antenna's contacts as shown in cross-section on FIG. 2. Pressure is then exerted on the chip 10 so that the non-deformable contacts of the chip sink into the contacts 17 and 19 of the antenna 12. Under the exerted pressure, the antenna's contacts are then deformed. The antenna's support 20 is compressed under the pressure exerted on the chip and can also get deformed. It is then noted that the contact surface between the chip's contacts and the contacts of the antenna 12 is maximum, even when the pressure is not being exerted any longer. The chip's contacts are preferably conical in shape. As a result of the pressure, the adhesive dielectric material spreads and covers the entire surface of the chip between the contacts and penetrates into the antenna support. It thus enables the mechanical assembly between the chip 10 and the antenna support 20—and thereby the electric contact between the chip and the antenna—to be reinforced. The adhesive dielectric material used is preferably fluid and has a strong penetrating power. The support is then passed through an oven in order to cross-link the glue.

Once the chip 10 is fixed to the support, the next step consists in laminating together the RFID device and the various layers that will make up the RFID device support. The embodiment described is adapted so that the RFID device support obtained can be built into an identity booklet such as a passport.

Figure 3:
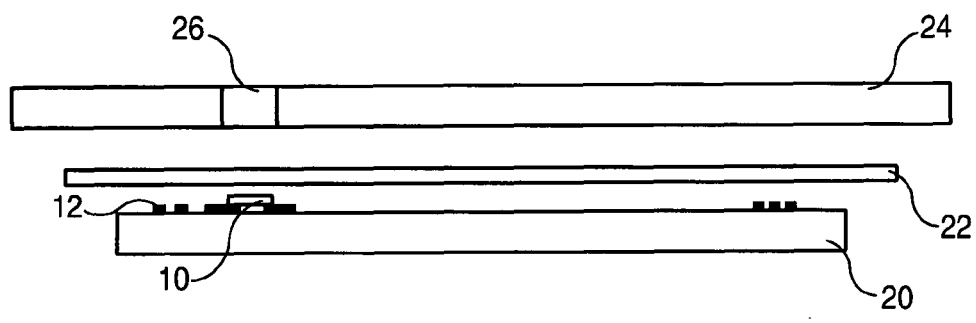
FIG. 3 represents a cross-section of the various layers which make up the RFID device support.

According to the preferred embodiment of the invention, the various layers that make up the RFID device support as shown in FIG. 3 comprise the antenna support 20, a thermoplastic layer 22 and a top layer 24. The thermoplastic material used for the layers 22 and 52 is preferably polyvinyl chloride (PVC), but could also be polyester (PET, PETG), polypropylene (PP), polycarbonate (PC) or acrylonitrile-butadiene-styrene (ABS).

The device is made by laminating the various layers once the chip is fixed on the antenna support 20. A first layer of thermoplastic 22 is placed on the antenna support 20. The thickness of the thermoplastic layer is between 40 and 80 μm and is preferably in the order of 50 μm. The top layer 24 features a cavity 26 located in such a way that it overlaps the chip and whose surface area is greater than that of the chip so that the pressure exerted during the lamination step does not reach the chip as the pressure is exerted uniformly over the entire surface of the sheet but is not exerted at the location of the cavity placed above the location of the chip. The cavity 26 is preferably circular with a diameter in the order of 5.5 mm.

Figure 4:
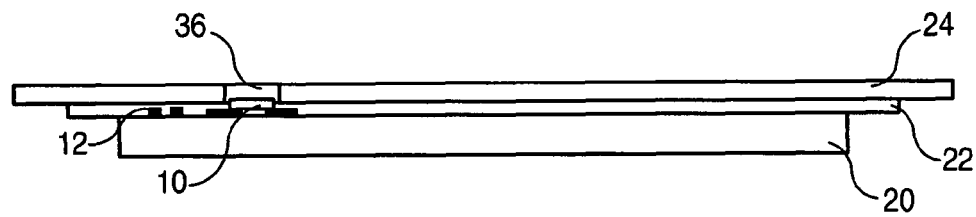
FIG. 4 represents a cross-section of the RFID device support according to the invention.

The lamination step consists in welding by hot press molding the layers 20, 22, 24 in order to obtain an RFID device support 2 as shown in FIG. 4. The temperature and the pressure reached are in the order of 150° C. and 200 bar respectively. As previously stated, the antenna support 20 is preferably made of a non-creeping material and thus a material that does not deform irreversibly when the temperature increases up to 150° C. Furthermore, this material cannot delaminate over time, whether or not it is intentional. The support 20 is preferably made of synthetic paper consisting of one single unoriented layer of a polymer such as polyethylene or polypropylene loaded with minerals between 40 and 80%. Its composition gives it a low density in the order of 0.57 g/cm$^3$ thanks to its microporous network and its thickness is in the order of 180 μm. The thickness may be less without deviating from the scope of the invention. Even though the thermoplastic layer 22, directly in contact with the chip, is not pierced with a cavity at the location of the chip, the pressure exerted during lamination is not transmitted to the chip to the extent that it gets damaged.

At the temperature and pressure values used during the lamination step, the thermoplastic comprising the layer 22 becomes soft and liquefies while being trapped between the two respective layers of the antenna support 20 and the top layer 24. During the lamination, the antenna support provides the device consisting of the antenna 10 and the chip 12 with a stiffness and a cohesion that prevent any electrical rupture since the material of the layer forming the antenna support resists without getting deformed and especially without creeping at temperatures and pressure of the lamination step. The stiffened thermoplastic layer 22 has trapped the raised designs of the antenna support 20 so that the antenna 10 and the chip 12 are embedded in the thermoplastic 22. A cross-section of the various layers 20, 22, 24 will show that the antenna 10 and the chip 12 are moulded in the thermoplastic 22, the latter having covered the chip at the location of the cavity 26. In this manner, in a humid environment, it is the thermoplastic layer that provides the RFID device with a stiffness and cohesion that prevent any electrical rupture. The thermoplastic enables the two layers 20 and 24 to be welded together and plays the role of a glue between these two layers.

The top layer 24 with a thickness of 180 μm is preferably of the same material as the antenna support 20, therefore of synthetic paper as defined above. The RFID device support 2 made in this manner by laminating layers 20, 22, 24 and shown in cross-section on FIG. 3 has a thickness of about 350 μm.

The flexibility of the RFID device support 2 obtained depends on the thickness of the thermoplastic layer 22 used. The more the thickness of the thermoplastic layer is reduced, the more the support is flexible. The RFID device support 2 is then glued on the side of the antenna support, on the bottom cover board 14 of the cover of the identity booklet. The bonding is done under pressure using a glue that, once dry, is insoluble in water.

Figure 5:
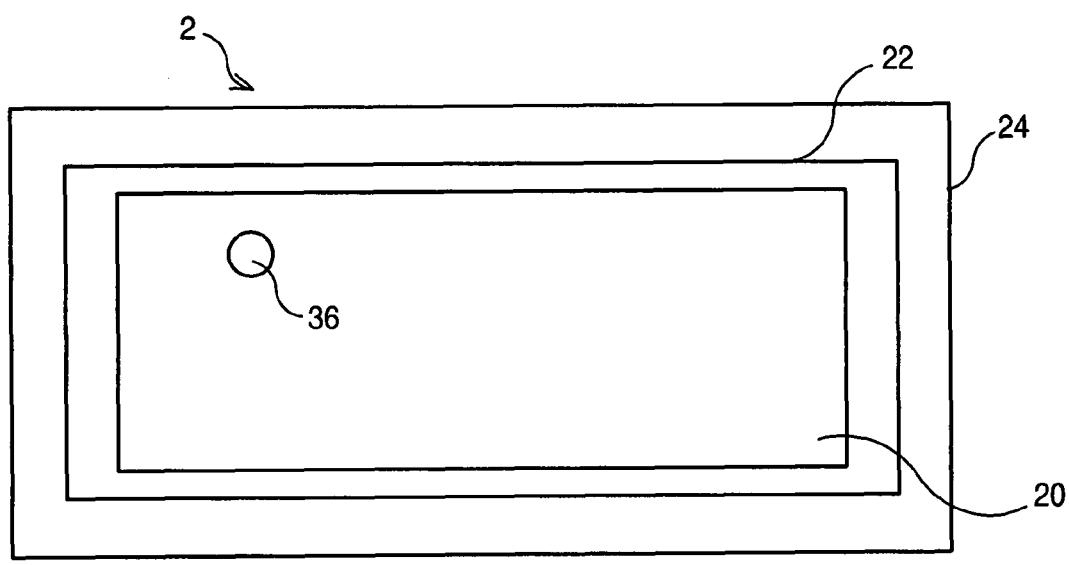
FIG. 5 represents the installation of the RFID device support in a passport.

According to FIG. 5, the RFID device support 2 is glued onto one of the two cover boards 11 of the identity booklet, preferably on the bottom cover board 14 but could also be glued onto the top cover board 16. The side of the RFID device opposite the antenna support and the chip, therefore layer 24, is glued on the cover board of the identity booklet in order to protect the chip as much as possible from impacts that could occur inside the booklet. More generally, the RFID device support 2 is glued using a glue which, once dry, is insoluble in water.

However, the RFID device support 2 as described can also be integrated by bonding one of its sides, preferably on the antenna support side, on any type of object such as clothes, books, paper documents, packaging, cartons, etc.

Figure 6:
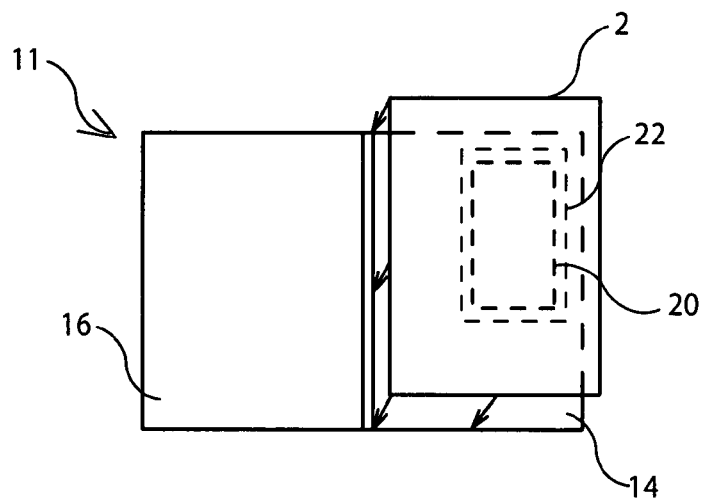
FIG. 6 represents a cross-section of the cover of the booklet and the installation of the RFID device support.
Figure 7:
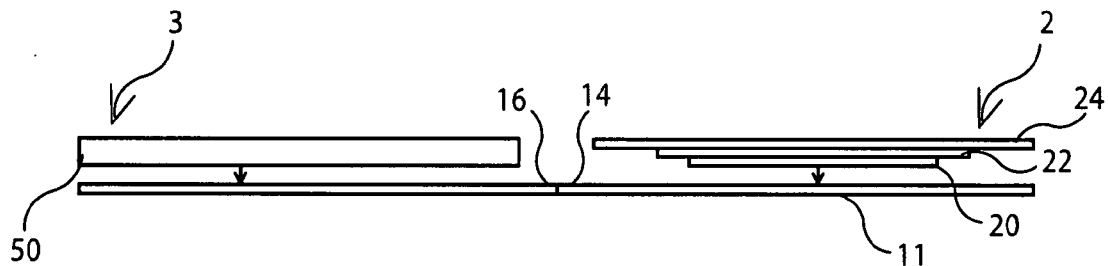
FIG. 7 represents a cross-section of the RFID device support according to a variant of the invention.

In order to maintain the same thickness over the entire cover of the booklet, it is advantageous to affix on the other cover board of the booklet, the one that does not bear the RFID device support, one or more layers whose total thickness is equivalent to that of the RFID device support 2. For example, and according to FIG. 6, it is possible to manufacture a support 3 without RFID device consisting of a single layer of synthetic paper or, alternately, to laminate together a layer of synthetic paper 50, a layer of thermoplastic 52 and a layer of synthetic paper 54 of the same total thickness as all of the layers 20, 22, and 24. The support 3 thus manufactured is then glued to the second cover board 11 of the booklet, while leaving a free strip of the cover at the location of the booklet joint, as shown in FIG. 7.

Figure 8:
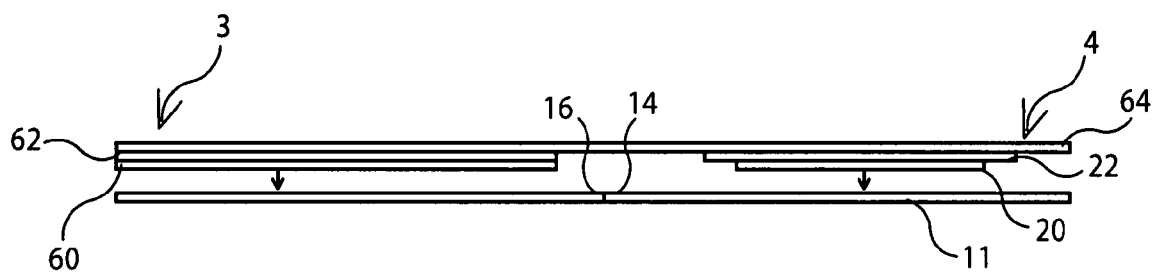
FIG. 8 represents a cross-section of the booklet cover and the installation of the RFID device support according to the variant.
Figure 9:
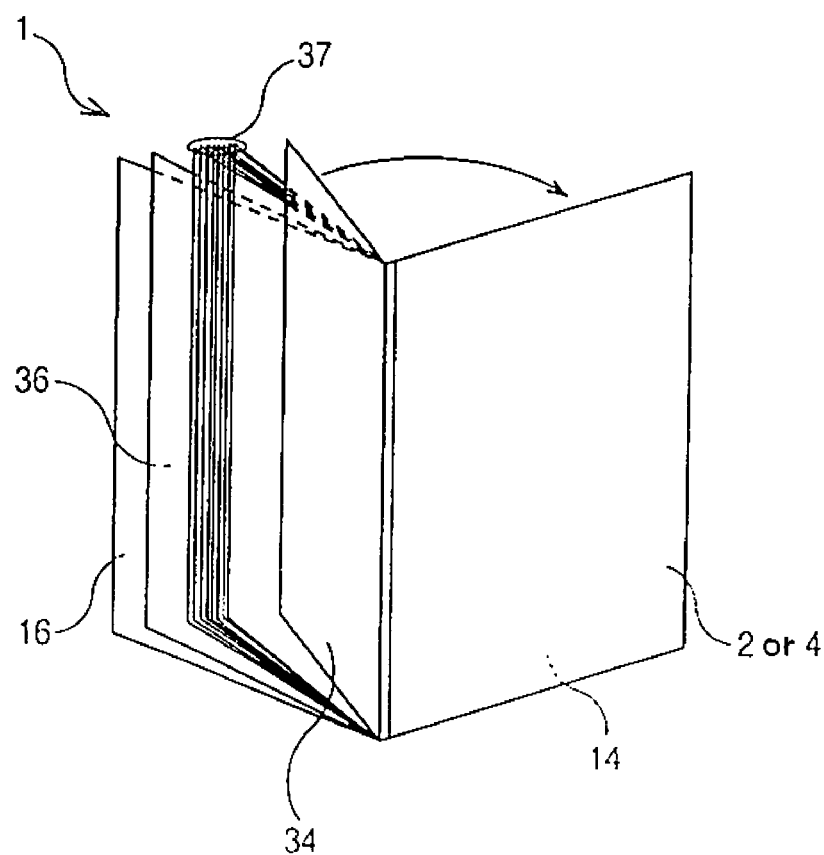
FIG. 9 represents the installation of the quire of inside pages of the booklet.

According to a variant, the supports 2 and 3 can be manufactured together in order to be integral with one another. In such a case, a layer of synthetic paper 64 makes up the top layer of the device support 4, as shown in FIG. 8. A first layer of thermoplastic 22 is placed on the antenna support 20 whose thickness is between 40 and 80 μm but preferably in the order of 50 μm. A second thermoplastic layer 62 is also placed on a second layer 60 of synthetic paper. The layers 20, 22, 60, and 62 having the same size corresponding in length to the size of a closed identity booklet but whose width is slightly lower. The top layer 64 is placed on the layers 22 and 62 so as to leave a space between them. The layer 64 features a cavity 26 located in such a way that it overlaps the chip and whose surface area is greater than that of the chip so that the pressure exerted during the lamination step does not reach the chip as the pressure is exerted uniformly over the entire surface of the sheet but is not exerted at the location of the cavity placed above the location of the chip. The cavity 26 is preferably circular with a diameter in the order of 6 mm. The lamination step then consists in welding by hot press moulding the various layers 20, 22, 60, 62, and 64.

The support 4 thus obtained and represented in cross-section in FIG. 8 has two thick parts designed to overlap cover boards 14 et 16 of the booklet cover 11 and a thinner part designed to overlap the identity booklet joint.

The identity booklet 1 represented diagrammatically in FIG. 5 is completely formed by installing the quire of inside pages. The manufacturing method consists in making the quire of inside pages by using a secure thread to connect them to one another. In the manufacture of a traditional passport, the flyleaves are laminated on the cover boards, the flyleaf 36 being laminated with the top cover board 16 while the bottom flyleaf 34 is laminated with the bottom cover board 14. In this manner, according to the invention, the back of the bottom flyleaf 34 of the quire of pages of the identity booklet is pasted then pressed against the RFID device support 2 glued on the bottom cover board of the booklet cover, thus on the side of the antenna support 20 layer. Or alternately, according to the variant described earlier, the back of the bottom flyleaf 34 of the quire of pages of the identity booklet is pasted then pressed against the part 42 of the support 4, the part 42 being the one containing the chip and the antenna whereas the front of the flyleaf 36 is pasted then pressed against the part 43 of the support 4. The glue used is preferably a glue that, once dry, becomes insoluble in water.

The use of synthetic paper in making the RFID device support is an indisputable advantage of the invention.

On the one hand, using synthetic paper simplifies the lamination operation carried out at temperatures in the order of 150° C., as it is stable at these temperatures contrary to thermoplastic materials such as PVC or PETG. The RFID device support 2 or 4 made according to the invention has synthetic paper on both its sides, which simplifies bonding and optimises its integration on the identity booklet as the bonding operations are carried out paper against paper. As a result, the synthetic paper has a low density due to its microporous structure, which provides it with a good affinity to gluing with paper contrary to traditional plastic materials such as PVC or PET. The identity booklet thus obtained has the advantage of a great cohesion between all of the parts that make it up and particularly between the RFID device and the identity booklet itself. The glue penetrates deeply into the synthetic paper as it penetrates into the paper and thus particularly in the paper of which the cover of the booklet is made, which makes it impossible to remove the layers 20, 22, and 24 from one another and which makes the three layers making up the support inseparable.

Furthermore, deliberate pulling out of the RFID device built into the booklet is not possible as the synthetic paper does not delaminate over the thickness.

According to a second embodiment not shown in the figures, the bottom cover board 14 or the upper cover board 16 of the identity booklet cover may be used as an antenna support. In such a case, the antenna is screen printed directly on the cover board 14 or 16 of the booklet cover, the chip is then connected to the antenna contacts and fixed to the support in the same manner as described previously on the antenna support 20. The two cover boards of the booklet are then covered with a thermoplastic layer, then with a top layer of a non-creeping material, that is to say a material that does not deform when the temperature increases, thus such as synthetic paper. In order to maintain the same thickness over the entire cover of the booklet, it is advantageous to affix on the other cover board of the booklet, the one that does not bear the RFID device, one or more layers whose total thickness is equivalent to that of the thermoplastic layer and the top layer that cover the RFID device. For example, it is possible to laminate a single layer of synthetic paper or, alternately, one layer of thermoplastic and one layer of synthetic paper. The two cover boards being covered such that the location of the booklet joint is left free. Alternately, it is possible to make a cavity in the top layer so that it overlaps the chip. The following step consists in laminating the whole set comprising the cover, the thermoplastic layer and the top layer, at a temperature of 160° C. and at a pressure of about 200 bar. The thickness of the thermoplastic layer chosen depends on the thickness of the chip that is used and the flexibility that is desired for the entire RFID device and cover.

During the lamination or thereafter, the outside of the booklet cover may be subjected to a plate having special raised designs to produce a particular grain on the cover to make the identity booklet tamper-resistant.

Although this embodiment is particularly advantageous for passports whose cover is made of reinforced paper, it is also applicable to passports whose cover is made of cloth.

Advantageously, the RFID device and the identity booklet according to the embodiments of the invention may be subjected to a passage through a washing machine without the electrical connection between the chip and the antenna being altered, thus maintaining for these items the ability to be read by electromagnetic coupling with a reader provided for this purpose.

The RFID device support and the RFID device may also be made in ISO format of smart cards so that they can be used to manufacture contactless smart cards. The two outer layers of synthetic paper and the PVC layer are in the ISO format of smart cards and the antenna is also adapted so that the size of turns is slightly less than the ISO format of smart cards. In this case, an additional step in the manufacturing method described above consists in customising the card by printing on one or both faces of the card.

Further, one of the advantages of the invention resides in the use of a chip that is directly connected to the antenna without being formed in a module, which enables the thickness to be reduced and help not to harm the aesthetic appearance of the passport cover.

The invention claimed is:

1. A radio frequency identification device support, comprising
an antenna screen printed on a support layer and
a chip connected to the connection terminals of said antenna,
wherein a thermoplastic layer and a top layer made of synthetic paper which does not delaminate are laminated on said antenna support such that said antenna and said chip are trapped in thermoplastic and wherein said antenna support layer, thermoplastic layer and top layer cannot be separated, so that the device support is resistant to water and humid environments,
wherein said synthetic paper consists of a single unoriented layer of polymer which contains 40 to 80% of a mineral.

2. The device support of claim 1, wherein said top layer includes a cavity located in such a way that it overlaps said chip.

3. The device support of claim 1, wherein said chip is glued on said antenna support layer using an adhesive dielectric material such that the contacts of the chip are located opposite the contacts of the antenna.

4. The device support of claim 3, wherein said adhesive material is an epoxy resin that cross-links at 150° C.

5. The device support of claim 1, wherein the thermoplastic layer and a top layer made of synthetic paper are laminated on said antenna support layer at temperature and pressure values on the order of 150° C. and 200 bar.

6. The device support of claim 1, wherein the synthetic paper of the top layer is made of a non-creeping material which does not deform when the temperature increases.

7. The device support of claim 1, wherein said thermoplastic layer has a thickness of 40 μm.

8. An identity booklet comprising a radio frequency identification device support of claim 1, wherein said device support is integrated between a cover board of an identity booklet cover and a flyleaf of the identity booklet located opposite said cover board.

9. The identity booklet of claim 8, wherein said antenna support layer is the cover board of said booklet.

10. The identity booklet of claim 8, wherein said device support is glued inside said identity booklet cover with a glue which, once dry, is insoluble in water.

11. A method for manufacturing an identity booklet with a radio frequency identification device, said device comprising an antenna and a chip connected to the antenna integrated between a first cover board of an identity booklet cover and a flyleaf, said method comprising the following steps:
screen printing an antenna having contacts on said first cover board of the identity booklet,
placing adhesive dielectric material between the contacts of the antenna,
positioning the chip on said first cover board so that the chip's contacts are located opposite said contacts of the antenna,
connecting the chip to the antenna's contacts by exerting pressure on the chip,
placing a thermoplastic layer on each of the cover boards of the booklet cover,
placing on each of said thermoplastic layers a top layer of a non-creeping material which is synthetic paper which does not delaminate, the layer applied on top of said cover board comprising the antenna and the chip being provided with a cavity at the location of the chip,
laminating together the cover, the thermoplastic layers and the top layers,
installing a quire of inside pages,
wherein said synthetic paper consists of a single unoriented layer of a polymer which contains 40 to 80% of a mineral.

12. A method for manufacturing an identity booklet with a radio frequency identification device, said device comprising an antenna and a chip connected to the antenna integrated between a first cover board of an identity booklet cover and a corresponding flyleaf, said method comprising the following steps:
screen printing an antenna having contacts on said first cover board of the identity booklet,
placing adhesive dielectric material between the contacts of the antenna,
positioning the chip on said first cover board so that the chip's contacts are located opposite said contacts of the antenna,
connecting the chip to the antenna's contacts by exerting pressure on the chip,
placing a thermoplastic layer on said first cover board of the identity booklet cover,
placing on said thermoplastic layer a first top layer of a non-creeping material which is synthetic paper which does not delaminate, the layer being provided with a cavity at the location of the chip, gluing on a second cover board of the booklet cover another top layer of a non-creeping material and whose thickness is equivalent to that of the first top layer, laminating together the cover, the thermoplastic layer and the top layers, installing a quire of inside pages, wherein said synthetic paper consists of a single unoriented layer of a polymer which contains 40 to 80% of a mineral.

13. A method for manufacturing a radio frequency identification device support, the device support comprising an antenna and a chip connected to the antenna, said method comprising the following steps:

screen printing an antenna having contacts on an antenna support, placing adhesive dielectric material between said contacts of the antenna, positioning the chip on said support so that the contacts of said chip are located opposite said contacts of said antenna, connecting the chip to said contacts of said antenna by exerting pressure on the chip, placing on said antenna support a thermoplastic layer and a top layer of a non-creeping material which is synthetic paper which does not delaminate, the top layer being provided with a cavity at the location of the chip, laminating said antenna support, the thermoplastic layer and the top layer together to obtain a radio frequency identification device support that is resistant to water and to humid environments, wherein said synthetic paper consists of a single unoriented layer of a polymer which contains 40 to 80% of a mineral.

14. The manufacturing method of claim 13, wherein said device is integrated between a first cover board of an identity booklet cover and a flyleaf, said method comprising the following steps after the lamination step:

gluing on said first cover board of the identity booklet cover the radio frequency identification device support on the side of the antenna support, gluing on a second cover board of the identity booklet cover a layer of a non-creeping material and whose thickness is equivalent to that of the radio frequency identification device support, installing a quire of inside pages, and gluing the front of the flyleaf against said RFID device support on the side of the top layer.

15. A smart card comprising the radio frequency identification device of claim 1, and which conforms to the ISO format for smart cards.

16. The smart card of claim 15, wherein at least one of the sides of the card is customized.

17. The method of claim 1, wherein said polymer of said synthetic paper is polyethylene or polypropylene.

18. The method of claim 12, wherein said non-creeping material comprises synthetic paper.

19. The method of claim 13, wherein said non-creeping material comprises synthetic paper.

20. The method of claim 14, wherein said non-creeping material comprises synthetic paper.

* * * * *